March 27, 1962 C. L. ALLEN 3,027,115
BLENDER CORD STORAGE ASSEMBLY
Filed March 23, 1960 2 Sheets-Sheet 2
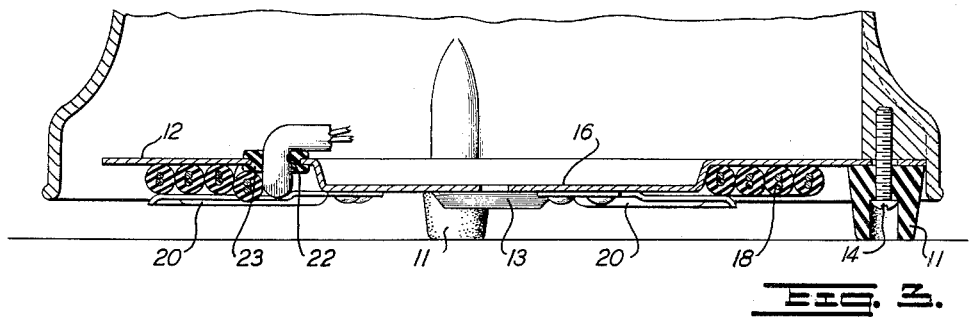
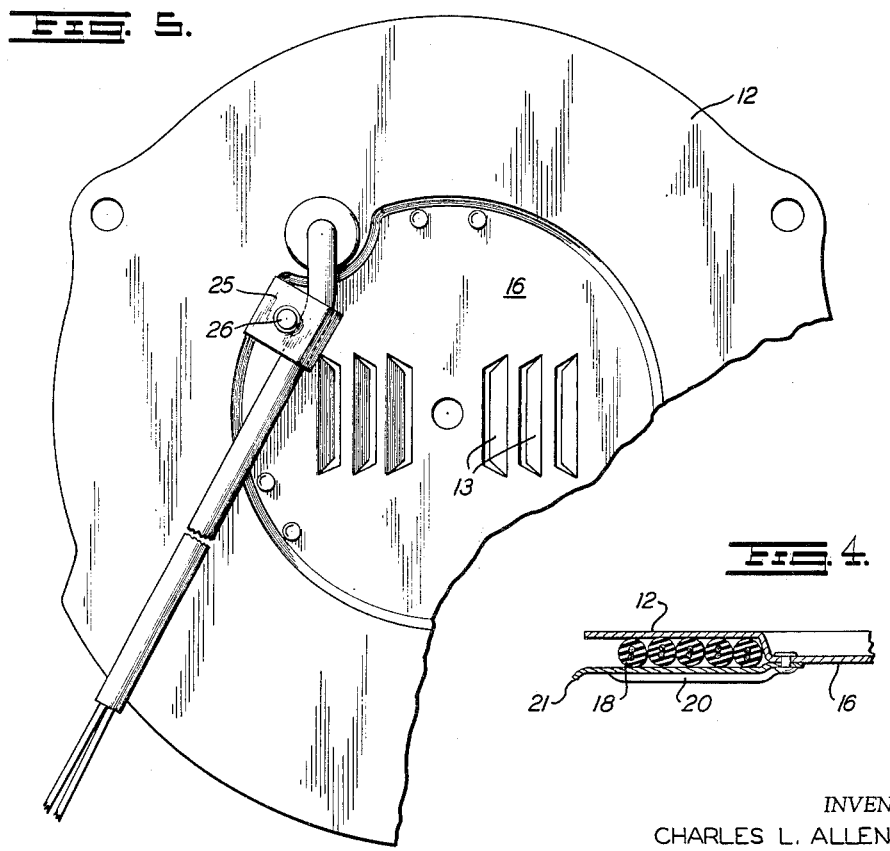
INVENTOR
CHARLES L. ALLEN

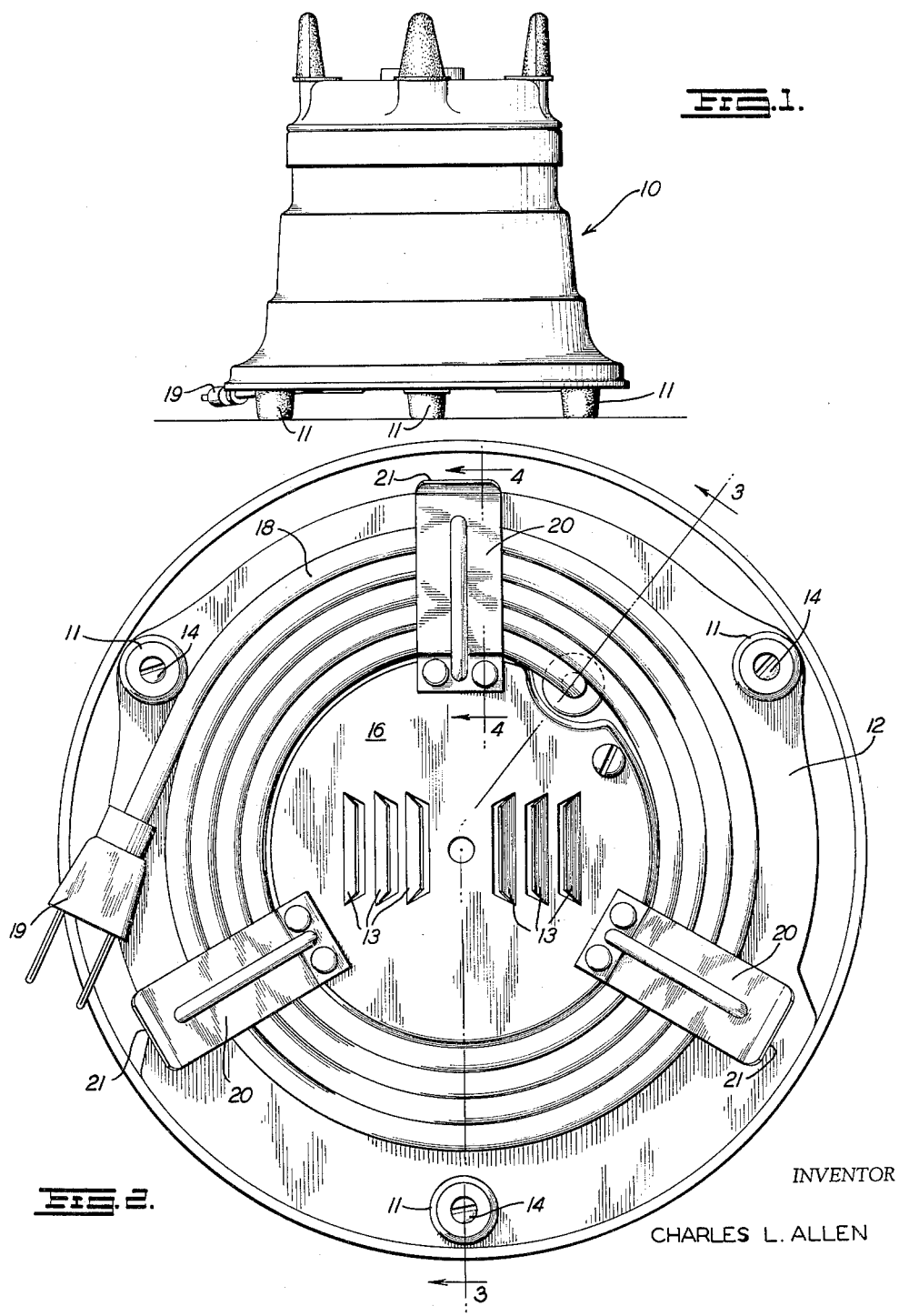

United States Patent Office 3,027,115
Patented Mar. 27, 1962

3,027,115
BLENDER CORD STORAGE ASSEMBLY
Charles L. Allen, West Englewood, N.J., assignor to Dynamics Corporation of America, New York, N.Y., a corporation of New York
Filed Mar. 23, 1960, Ser. No. 17,060
1 Claim. (Cl. 242—85.1)

The present invention relates to improvements in electrical appliances of the character having a base and a cord set and is concerned more particularly with cord set storage assemblies for such electrical appliances.

It is well known that electrical appliances are usually supplied with cord sets for connection with a source of electric current, such as a household convenience outlet, for energizing the operating means of the appliance. It is also well known that such cord sets are usually of extended length so that the appliance may be used at places remote from the point of electrical connection. In many instances, however, particularly in the case of kitchen appliances such as blenders or toasters, the appliance usually remains in a stationary position quite close to the convenience outlet and the resulting excess length of the cord set is space consuming and unsightly. Attempts have been made heretofore to store such excess lengths of cord sets such as by wrapping the excess length around the appliance which is hazardous as well as unsightly and in other ways such as by the provision of reels or the like which are usually bulky and expensive.

Accordingly, it is an object of the present invention to provide a cord set storage assembly for electrical appliances which is extremely simple in construction, arrangement of parts and in the use thereof.

A further object of the invention is to provide a cord set assembly for electrical appliances wherein the excess length of the cord remains concealed from sight within the base of the appliance and only that portion of the length thereof which is needed to reach the electrical outlet is exposed to view.

Other objects and advantages of the invention will be apparent from the following detailed description taken in conjunction with the accompanying drawings wherein a preferred embodiment of the principles of the invention has been selected for exemplification.

In the drawings:

FIG. 1 is a side elevational view of the base of an electric blender equipped with the cord set assembly of the present invention;

FIG. 2 is an enlarged bottom view of FIG. 1;

FIG. 3 is a fragmentary sectional view taken on the line 3—3 of FIG. 2 and looking in the direction of the arrows;

FIG. 4 is a detailed sectional view taken on the line 4—4 of FIG. 2; and

FIG. 5 is a top plan view partly broken away of the base plate as shown in FIGS. 2 and 3.

Referring more particularly to the drawings, wherein like numerals refer to like parts, the blender base indicated in its entirety at 10 in FIG. 1 and having supporting feet 11 may be of a character as shown in Patent No. 2,109,501, for example, and marketed as the Waring Blendor or any other conventional character, it being under stood that, for the purposes of the present invention, the blender base shown is merely illustrative of many other kinds of electrical appliances which include a base and a cord set. FIG. 1 also illustrates the manner in which the cord set assembly of the present invention is adapted to be concealed within the base of the particular electrical appliance to which it is attached.

Referring now to the other figures of the drawings, the device of the present invention includes a base plate 12 which is adapted for attachment to the base of the electrical appliance by any suitable means such as the screws 14 preferably so that the plate 12 is supported within the base above its bottom, as indicated in FIGS. 1 and 3. The base plate 12 may include vents 13 for the circulation of cooling air for the motor of the appliance. A crown member 16 preferably depends centrally of the base plate 12 and may be formed integrally therewith such as by a stamping operation. The crown 16, as indicated in FIGS. 2 and 3, forms a spool like element around which the cord set 18 may be wrapped or coiled leaving the connector plug 19 of the cord set free at the outer end. As shown, the crown member 16 may be of frusto-conical configuration or wedge shape in cross-section and it is desirable that the depending annular edge thereof be relatively sharp to provide an adequate peripheral surface for receiving the cord set 18.

For retaining the cord set 18 in its wrapped around or coiled position, suitable flange means preferably in the form of a plurality of spring fingers 20 having flared ends 21 are riveted or otherwise suitably attached to the crown member 16 to extend radially outwardly thereof in substantial parallelism with the base plate 12, as shown. As best indicated in FIGS. 3 and 4, the spring fingers 20 are also spaced from the base plate 12 a distance substantially equal to the thickness of the cord set 18 so that the spring fingers 20 tend to urge the wrapped around or coiled portion of the cord set against the base plate 12, thus providing an exceedingly compact assembly which may be readily concealed within the base of the electrical appliance to which it is attached.

The base plate 12 is preferably provided with an apertured portion 22 for insertion of the cord set 18 to extend above the base plate for connection with the operating means of the electrical appliance and, in a preferred embodiment of the invention, the aperture 22 is adjacent to the area of the crown member 16 so that the inserted portion of the cord set forms a continuation of the peripheral area of the crown member 16, as indicated in FIG. 2.

To assemble the device as herein illustrated and described, a grommet 23 is snapped into the aperture 22 in the plate 12 and the cord 18 and inserted through the grommet. A strain relief clamp indicated at 25 is loosely attached to the plate 12 by a screw 26 and after the cord set 18 is slipped under the strain relief clamp 25, the screw 26 is then tightened to hold the cord set in place. The extended upper end of the cord set 18 is connected to the motor or other operating means of the electrical appliance and the plate 12 is then secured by means of the screws 14 to the base of the appliance. It will be understood, of course, that the cord set 18 may be extended for its full length from its point of anchor to the base plate 12 and that all or any selected portion of the length thereof may be wrapped around the crown member 16 or otherwise coiled against the base plate 12 as conditions for storage of the cord may require.

It is to be understood that the present invention is not confined to the precise construction and arrangement of parts herein illustrated and described but embraces also such modifications thereof as come within the scope of the following claim.

I claim:

In an electrical blender including a base and an electrical cord, a base plate recessed within said base, means for securing said base plate within said base substantially parallel to the lower edge thereof, a substantially circular crown member depending centrally of said base plate, the depth of said crown member being substantially equal to the diameter of said cord, a concave indentation in the periphery of said crown member, an aperture through said plate adjacent to said concave indentation through which said cord is adapted to extend with a portion of said cord extending above said base plate for connection with the operating means for said blender and the remaining portion of said cord extending beneath said base plate so that the portion of the cord extending through said aperture forms a continuation of the periphery of said crown member, a plurality of spring clips extending radially outwardly from said crown member and spaced from said base plate a distance substantially the same as the thickness of said cord, the said remaining portion of said cord being adapted to be wrapped around said crown member and received in the space between said base plate and spring clips, the spring clips urging the wrapped around portion of said cord against said plate.

References Cited in the file of this patent

UNITED STATES PATENTS

| | | |
|---|---|---|
| 912,796 | Boye | Feb. 16, 1909 |
| 1,896,741 | Crandall | Feb. 7, 1933 |
| 2,231,001 | Engstrom | Feb. 11, 1941 |
| 2,536,776 | Smellie | Jan. 2, 1951 |
| 2,816,718 | Chewning | Dec. 17, 1957 |